(12) United States Patent
Sallam

(10) Patent No.: US 7,840,501 B1
(45) Date of Patent: Nov. 23, 2010

(54) BEHAVIORAL ANALYSIS APPARATUS AND ASSOCIATED METHOD THAT UTILIZES A SYSTEM SELECTED BASED ON A LEVEL OF DATA

(75) Inventor: Ahmed Said Sallam, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 698 days.

(21) Appl. No.: 11/777,222

(22) Filed: Jul. 12, 2007

(51) Int. Cl.
*G06G 7/00* (2006.01)
*G06E 1/00* (2006.01)
*G06E 3/00* (2006.01)
*G06F 15/00* (2006.01)
*G06N 1/00* (2006.01)

(52) U.S. Cl. ..................... 706/10
(58) Field of Classification Search .......... 706/10
See application file for complete search history.

(56) References Cited

U.S. PATENT DOCUMENTS

| | | | | |
|---|---|---|---|---|
| 6,128,315 | A * | 10/2000 | Takeuchi | 370/466 |
| 2003/0023774 | A1 | 1/2003 | Gladstone et al. | 709/328 |
| 2004/0193943 | A1 | 9/2004 | Angelino et al. | 714/4 |
| 2008/0104130 | A1 | 5/2008 | Sallam | 707/200 |
| 2008/0109906 | A1 | 5/2008 | Sallam | 726/24 |
| 2008/0127344 | A1 | 5/2008 | Sallam | 726/23 |
| 2008/0288303 | A1 * | 11/2008 | Gray et al. | 705/7 |

OTHER PUBLICATIONS

Automatic Detection of Sentence and Clause Units using Local Syntactic Dependency, Kawahara, T.; Saikou, M.; Takanashi, K.; Acoustics, Speech and Signal Processing, 2007. ICASSP 2007. IEEE International Conference on vol. 4 Digital Object Identifier: 10.1109/ICASSP.2007.367179 Publication Year: 2007 , pp. IV-125-IV-128.*
Work in progress: preliminary analysis of developing team building skills in community college students, Akins, L.M.; Barbuto, D.C.; Frontiers in Education, 2004. FIE 2004. 34th Annual Digital Object Identifier: 10.1109/FIE.2004.1408786 Publication Year: 2004 , pp. S3G/24-S3G/25 vol. 3.*
Understanding and executing a declarative sentence involving a forms-of-be verb, Faris, W.; Cheng, K.; Systems, Man and Cybernetics, 2009. SMC 2009. IEEE International Conference on Digital Object Identifier: 10.1109/ICSMC.2009.5346782 Publication Year: 2009 , pp. 1633-1638.*
Design and evaluation of a phonological phrase parser for Spanish text-to-speech, Karn, H.E.; Spoken Language, 1996. ICSLP 96. Proceedings., Fourth International Conference on vol. 3 Digital Object Identifier: 10.1109/ICSLP.1996.607953 Publication Year: 1996 , pp. 1696-1699 vol. 3.*

* cited by examiner

*Primary Examiner*—Michael Holmes
(74) *Attorney, Agent, or Firm*—Zilka-Kotab, PC

(57) ABSTRACT

A behavioral analysis technique is provided that utilizes a system selected based on a level of data. In use, a level associated with data is identified. In addition, a behavioral analysis is performed on the data utilizing one of a plurality of systems that is selected based on the identified level.

21 Claims, 7 Drawing Sheets

BEHAVIORAL ANALYSIS APPARATUS AND ASSOCIATED METHOD THAT UTILIZES A SYSTEM SELECTED BASED ON A LEVEL OF DATA

FIELD OF THE INVENTION

The present invention relates to data analysis, and more particularly to performing a behavioral analysis on data.

BACKGROUND

Traditionally, data analysis has been performed by systems (e.g. security systems, etc.) for determining whether such data is unwanted (e.g. Mal ware, etc.). Oftentimes, centrally managed systems are utilized for such data analysis, in which a central server analyzes data associated with multiple client devices. The centrally managed systems thus allow the central server to analyze data associated with one client device in view of other data received by the central server, such that a more comprehensive analysis may be performed.

However, such centrally managed systems have customarily been associated with various limitations. For example, large amounts of data communicated to a single central server from many client devices for analysis poses a manageability problem for the central server, in that the central server may generally be unable to manage all of the data. As another example, analyzing all data at a central server allows the central server to access even confidential data (e.g. banking information, passwords, etc.) associated with client devices that such client devices may not necessarily want disclosed.

As yet another example, use of a central server oftentimes results in scalability problems. In particular, the central server is generally required to receive and store large amounts of data communicated to such central server by client devices, which causes memory capacity and bandwidth consumption. In addition, processing resources of the central server are conventionally restricted and thus not necessarily capable of performing an analysis on all data communicated to the central server in a timely manner.

There is thus a need for addressing these and/or other issues associated with the prior art.

SUMMARY

A behavioral analysis technique is provided that utilizes a system selected based on a level of data. In use, a level associated with data is identified. In addition, a behavioral analysis is performed on the data utilizing one of a plurality of systems that is selected based on the identified level.

DETAILED DESCRIPTION

Figure 1:
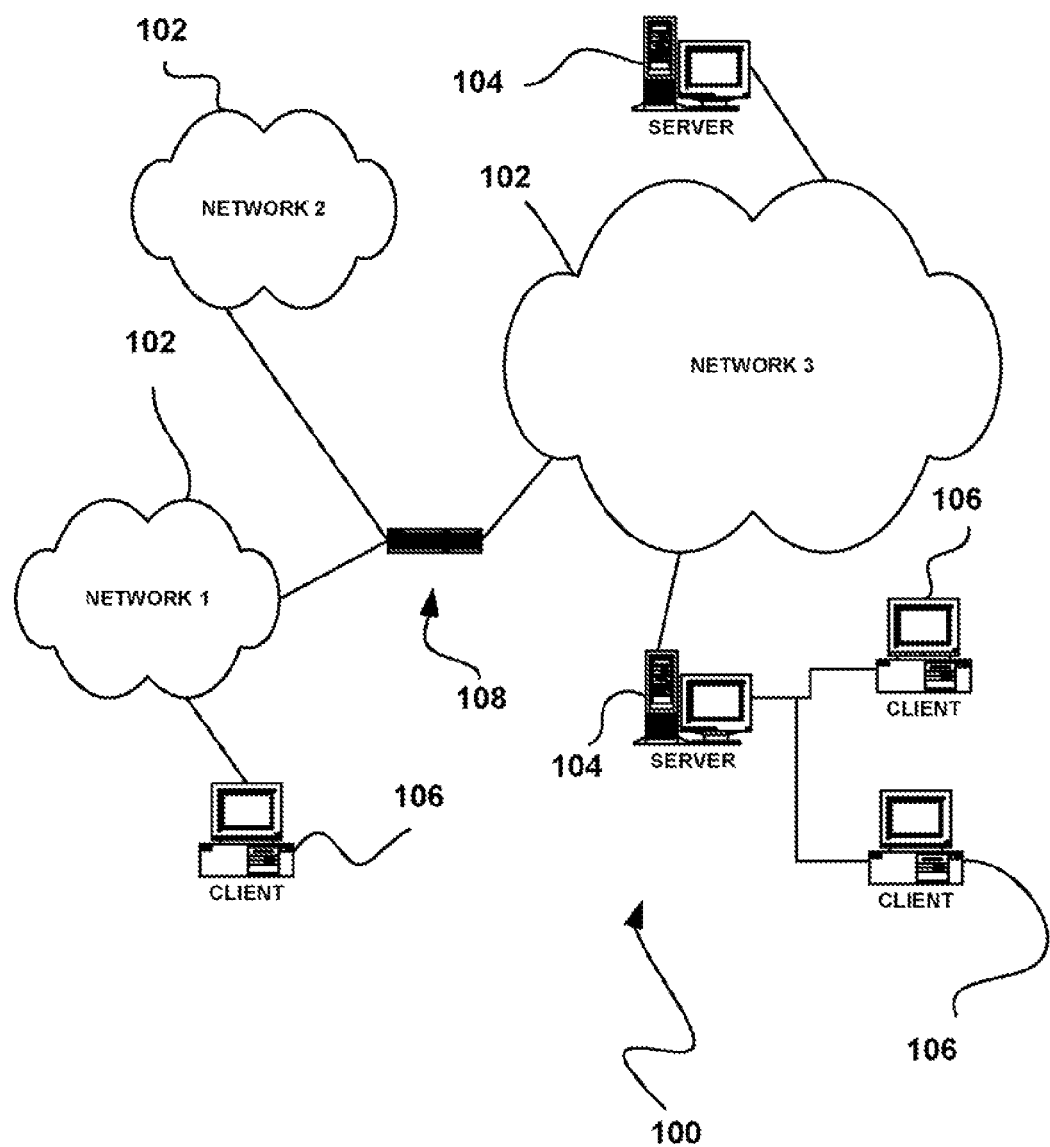
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, a peer-to-peer network, a personal area network (PAN), etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
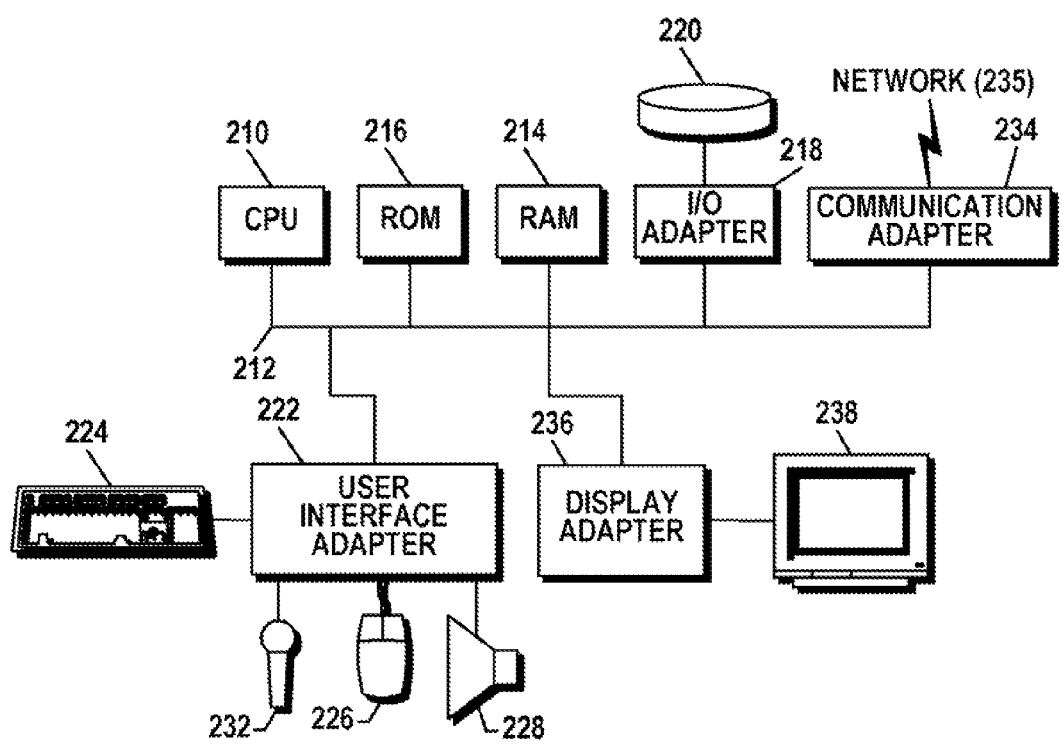
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212

The workstation shown in FIG. 2 includes a Random Access Memory (RAM) 214, Read Only Memory (ROM) 216, an 110 adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system, it will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
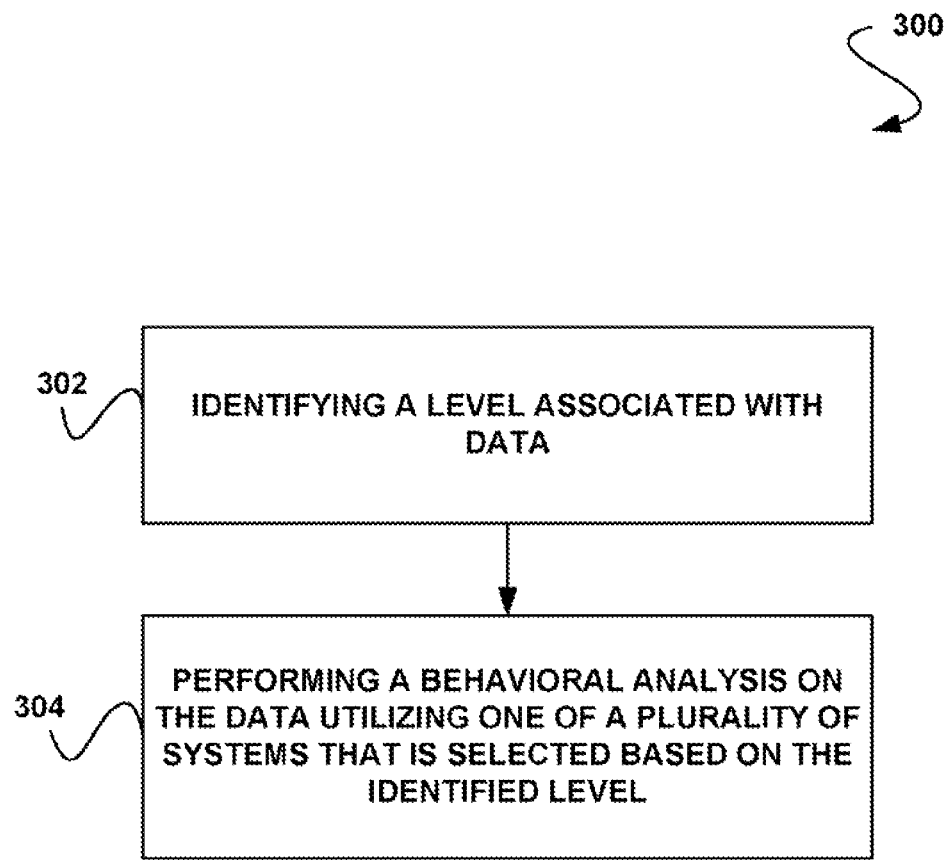
FIG. 3 shows a method for performing a behavioral analysis on data utilizing a system selected based on a level of the data, in accordance with one embodiment.

FIG. 3 shows a method 300 for performing a behavioral analysis on data utilizing a system selected based on a level of the data, in accordance with one embodiment. As an option, the method 300 may be carried out in the context of the architecture and environment of FIGS. 1 and/or 2. Of course, however, the method 300 may be carried out in any desired environment.

As shown in operation 302, a level associated with data is identified. In the context of the present description, the data may include any data on which a behavioral analysis may be performed. In one embodiment, the data may be associated with (e.g. describe, etc.) an event that occurred on a local system e.g. such as any of the devices described above with respect to FIGS. 1 and/or 2).

For example, the event may include execution of a process (e.g. downloading of content, etc.), execution of an application (e.g. device drivers, dynamic link libraries, etc.). Furthermore, the data may include any aspects of the event. Just by way of example, the data may include a memory snapshot, a unique identifier (e.g. signature, etc.), version information, etc. associated with the event.

In another embodiment, the data may be identified utilizing a computer program (e.g. agent, etc.). Just by way of example, such computer program may be capable of monitoring events, and generating such data based on such monitoring. As an option, the computer program may be installed on the local system for which the event is identified. Of course, however, the data may be identified in any desired manner.

Moreover, the level associated with the data may include any desired categorization of the data. In one embodiment, the level may indicate a type of the data. In another embodiment, the level may indicate a confidentiality of the data. For example, the level may indicate any systems (e.g. the local system associated with the data, systems remote with respect to the local system etc.) to which the data may be disclosed (e.g. sent, etc.).

Thus, different, levels may each be associated with a different categorization, such as a different set of systems. For example, one level may include a local level. Such local level may indicate that the data may be only disclosed to the local system for which the data was identified.

As another example, another level may include an enterprise level. The enterprise level may indicate that the data may only be disclosed to the local system and an enterprise system. In one embodiment, the enterprise system may include a server in communication with a plurality of local systems. Just by way of example, the enterprise system may be in communication with local systems within a private network (e.g. intranet of an organization, company, etc.).

As still yet another example, another level may include a global level. Such global level may indicate that the data may only be disclosed to the local system, the enterprise system and a global system. In one embodiment, the global system may include a server in communication with a plurality of local systems and/or a plurality of enterprise servers (e.g. in the same or different networks).

As an option, the level may be identified based on predefined rules. Such rules may be user configured (e.g. by an administrator), for example. In one embodiment, the predefined rules may indicate, for each level, characteristics capable of being associated with data within the level. Thus, characteristics of the data may be utilized for identifying the level associated with various data. In another embodiment, the predefined rules may indicate events associated with each level, such that the level of the data may be identified based on the event with which the data is associated. It should be noted, however, that the level associated with the data may be identified in any desired manner.

Furthermore, a behavioral analysis is performed on the data utilizing one of a plurality of systems that is selected based on the identified level, as shown in operation 304. In one embodiment, the identified level may indicate the system to be utilized in performing the behavioral analysis on the data. In another embodiment, the identified level may be uniquely associated with the system to be utilized in performing the behavioral analysis. To this end, each of a plurality of different levels may be associated with different systems for analyzing associated data.

For example, the systems may include a local system. As another example, the systems may include a remote system (e.g. with respect to the local system). In various embodiments, such remote system may include an enterprise system, a global system, etc. Moreover, the systems may be hierarchical.

In one exemplary embodiment where the identified level associated with the data includes a local level, the local system may be selected. Thus, if it is determined that the local system is selected, the behavioral analysis may be performed utilizing the local system. In another exemplary embodiment where the identified level associated with the data includes an enterprise level, the enterprise system may be selected. Accordingly, if it is determined that the enterprise system is selected, the data may be transmitted from the local system to the enterprise system and the behavioral analysis may be performed utilizing the enterprise system.

In yet another exemplary embodiment where the identified level associated with the data includes a global level, the global system may be selected. To this end, if it is determined that the global system is selected, at least a portion of the data may be transmitted from the enterprise system and/or local system to the global system, and the behavioral analysis may be performed utilizing the global system. In this way, the data may optionally be transmitted to a remote system associated with the level of the data based on a hierarchy of the systems (e.g. from the local system to the enterprise system, from the local system to the global system via the enterprise system, etc.). In one embodiment, the data may be filtered before being transmitted from the enterprise system and/or local system to the global system. For example, such filtering may include removing, at least a portion of the data (e.g. confidential portion, etc.).

In the context of the present description, the behavioral analysis may include any analysis capable of being performed on the data that is based, at least in part, on a behavior. Such behavior may include a behavior associated with the data (e.g. described by the data or corresponding event, etc.), a behavior of the local system (or portion thereof associated with the data, etc. For example, in one embodiment, the behavioral analysis may include analyzing the data with respect to other data (e.g. other data identified by or received by the selected system).

In another embodiment, the behavioral analysis may include analyzing the data based on behavioral analysis rules. Such rules may optionally be specific to the selected system. For example, each system may include (e.g. store, etc.) a different set of behavioral analysis rules for performing the behavioral analysis. Optionally, the rules may be automatically generated, user generated, etc.

Moreover, the behavioral analysis may be performed for determining whether the data is unwanted (e.g. associated with unwanted events, etc.). For example, the unwanted data may include malware, etc. To this end, data may be partitioned to different systems for behavioral analysis based on a level of such data. In addition, the system may be selected for performing the behavioral analysis on the data based on the level of the data, such that unwanted disclosure of the data, for example, where the data is confidential, may be prevented. For instance, the behavioral analysis of the data may be performed by a system to which disclosure of such data is allowed.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
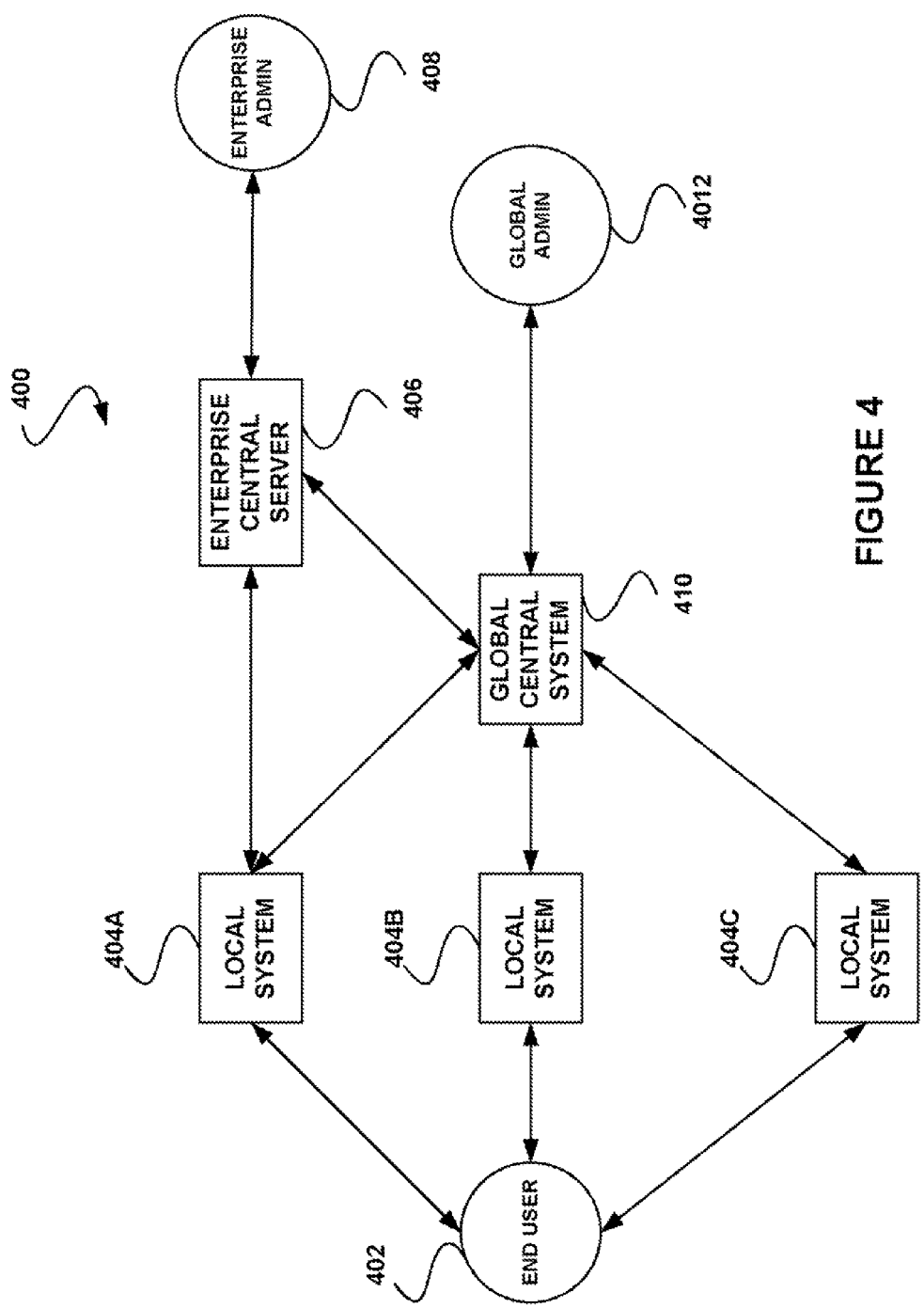
FIG. 4 shows a system for performing a behavioral analysis on data utilizing a system selected based on a level of the data, in accordance with another embodiment.

FIG. 4 shows a system 400 for performing a behavioral analysis on data utilizing a system selected based on a level of the data, in accordance with another embodiment. As an option, the present system 400 may be implemented to carry out the method 300 of FIG. 3. Of course, however, the system 400 may be implemented in any desired environment. It should also be noted that the aforementioned definitions may apply during the present description.

As shown, a plurality of local systems 404A-C is controlled and used (e.g. managed, etc.) by an end user 402. The local systems 404A-C may include any systems in which data may be identified for behavioral analysis purposes. For example, the local systems 404A-C may include any of the devices described with respect to FIGS. 1 and/or 2.

Still yet, each local system 404A-C may include categorization rules for identifying levels associated with data. In one embodiment, the categorization rules may be user defined. For example, a computer program installed on each of the local systems 404A-C may monitor events occurring on an associated local system 404A-C for identifying (e.g. generating, etc.) data associated therewith. The local systems 404A-C may further apply the categorization rules to the data for determining a level of the data. In various embodiments, the data may be associated with a single level or multiple levels.

In addition, the local systems 404A-C may each include a local behavioral analysis application and local behavioral rules. The local behavioral analysis rules may include positive rules e.g. rules indicating which data, or events associated therewith, are allowed) and/or negative rules (e.g. rules indicating which data, or events associated therewith, are not allowed). Thus, if it is determined that the level of the data is a local level, a behavioral analysis may be performed on the data utilizing the local behavioral analysis application of the local system 404A-C where the data originated. For example, the local behavioral analysis application may apply the local behavioral analysis rules to the data. As an option, the local system 404A-C may aggregate data (e.g. data identified at the local system 404A-C over a predefined period of time), and may perform the behavioral analysis on such aggregated data. Such aggregation may optionally include aggregating data associated with the same event.

Furthermore, results of the behavioral analysis may be presented to the end user 402. For example, the results may indicate whether the data, or an event associated therewith, is at least potentially unwanted (e.g. malware, attempted exploit of a vulnerability, etc.). For example, the results may indicate whether the data is at least potentially harmful to the local system 404A-C from which such data was identified.

The end user 402 may utilize such results for generating additional local behavioral analysis rules, as an option. For example, the end user 402 may interact with an interface of the local behavioral analysis application for receiving the results and generating the additional local behavioral analysis rules. Of course, however, the additional local behavioral analysis rules may also be automatically generated based on the results (e.g. utilizing the local behavioral analysis application, etc.). To this end, the local system 404A-C may utilize additional local behavioral analysis rules during another subsequent behavioral analysis of local data that is associated with the local level. Accordingly, each local system 404A-C may optionally include different sets of local behavioral analysis rules.

if however, it is determined that the level of the data is an enterprise level based on the categorization rules, a behavioral analysis may be performed on the data utilizing an enterprise system 406. As an option, the enterprise system 406 may include a server located on an enterprise network. Of course, however, the enterprise system 406 may include any of the devices described above with respect to FIGS. 1 and/or 2.

Thus, the data may be transmitted uploaded, etc.) from the local system 404A-C on which the data was identified to the enterprise system 406, such that the enterprise system 406 may perform the behavioral analysis on the data. For example, the enterprise system 406 may include an enterprise behavioral analysis application and enterprise behavioral analysis rules for performing the behavioral analysis. The enterprise behavioral analysis rules may optionally include a different set of behavioral analysis rules than the local behavioral analysis rules utilized by the local systems 404A-C.

In one embodiment, the enterprise system 406 may perform the behavioral analysis on the data with respect to other data received by the enterprise system 406. For example, the enterprise system 406 may aggregate data received from any of the local systems 404A-C. To this end, the enterprise system 406 may perform the behavioral analysis on the aggregated data.

Additionally, results of the behavioral analysis performed at the enterprise system 406 may be presented to an enterprise administrator 408. The enterprise administrator 408 may control the enterprise system 406, for example. Optionally, the enterprise administrator 408 may utilize such results for generating additional enterprise behavioral analysis rules. For example, the enterprise administrator 408 may interact with an interface of the enterprise behavioral analysis application for receiving the results and generating the additional enterprise behavioral analysis rules. Of course, however, the additional enterprise behavioral analysis rules may also be automatically generated based on the results (e.g. utilizing the enterprise behavioral analysis application, etc.). To this end, the enterprise system 406 may utilize additional enterprise behavioral analysis rules during another subsequent behavioral analysis of data that is associated with the enterprise level.

Also, the results of the behavioral analysis performed at the enterprise system 406 may be transmitted to the local system 404A-C from which the data was received. Furthermore, such results may be presented to the end user 402. Thus, the local system 404A-C and/or end user 402 associated therewith may be informed of the results of the behavioral analysis.

In another embodiment, if it is determined that the level of the data is a global level based on the categorization rules, a behavioral analysis may be performed on the data utilizing a global system 410. As an option, the global system 410 may include a server located on a global network (e.g. the Internet, etc.). Of course, however, the global system 410 may include any of the devices described above with respect to FIGS. 1 and/or 2. Also, the global system 410 may optionally be associated with a third party service provider, such as, for example, a security system provider. To this end, the global system 410 may optionally perform behavioral analyses on data received from multiple different enterprise systems 406 and/or local systems 404A-C.

As shown, in one embodiment, the data may be transmitted from a local system 404A-C, from which the data was identified, to the global system 410 via the enterprise system 406. Thus, the enterprise system 406 may optionally filter the data before transmitting the data to the global system 410. For example, such filtering may allow at least a portion of the data (e.g. confidential portion, etc.) to be removed from the data.

As also shown, in another embodiment, the data may be transmitted from a local system 404A-C, from which the data was identified, directly to the global system 410. Thus, the local systems 404A-C may optionally be in direct communication with the global system 410. In one embodiment, the local systems 404A-C may be in direct communication with the global system 410 only if permission for such direct communication is provided by the enterprise system 406.

Further, the global system 410 may include a global behavioral analysis application and global behavioral analysis rules utilized thereby for performing the behavioral analysis. The global behavioral analysis rules may optionally include a different set of behavioral analysis rules than the local behavioral analysis rules utilized by the local systems 404A-C and the enterprise behavioral analysis rules utilized by the enterprise system 406.

in one embodiment, the global system 410 may perform the behavioral analysis on the data with respect, to other data received by the global system 410. For example, the global system 410 may aggregate data received from any of the local systems 404A-C and/or enterprise system 406. To this end, the global system 410 may perform the behavioral analysis on the aggregated data.

Still yet, results of the behavioral analysis performed at the global system 410 may be presented to a global administrator 412. Such global administrator 412 may control the global system 410, for example. Optionally, the global administrator 412 may utilize such results for generating additional global behavioral analysis rules, as an option. For example, the global administrator 412 may interact with an interface of the global behavioral analysis application for receiving the results and generating the additional global behavioral analysis rules.

Of course, however, the additional global behavioral analysis rules may also be automatically generated based on the results (e.g. utilizing the global behavioral analysis application, etc.). In this way, the global behavioral analysis rules may be generated utilizing the global system 410 based on data collected from a plurality of other systems (e.g. local systems 404A-(, enterprise system 406, etc.). To this end, the global system 410 may utilize additional global behavioral analysis rules during another subsequent behavioral analysis of data that is associated with the global level.

Also, the results of the behavioral analysis performed at the global system 410 may be transmitted to the local system 404A-C (e.g. directly or via the enterprise system 406) from which the data was received. Furthermore, such results may be presented to the end user 402. Thus, the local system 404A-C and/or end user 402 associated therewith may be informed of the results of the behavioral analysis.

Thus, as shown, the system selected to perform the behavioral analysis on the data may be identified by a local system 404A-C associated with the data based on a level of such data. Moreover, each of the systems (e.g. the local systems 404A-C, the enterprise system 406, and the global system 410) may include different sets of behavioral analysis rules. In one possible embodiment, the behavioral analysis rules utilized by one of the systems may be at least partially unknown by the other systems. For example, access to at least some of the behavioral analysis rules associated with each of the systems may be prevented with respect to the other systems for securing the behavioral analysis rules e.g. from unwanted disclosure, manipulation by hackers, etc.).

Moreover, selecting a system 404A-C, 406 and 410 for performing behavioral analysis on data based on a level of the data may optionally allow a confidentiality of the data to be maintained. For example, performing the behavioral analysis on the data at the local system 404A-C may prevent the data from being disclosed outside of the local system 404A-C. As another example, performing the behavioral analysis on the data at the enterprise system 406 may prevent the data from being disclosed outside of an enterprise network associated with the enterprise system 406. Still yet, partitioning the performance of the behavioral analysis among the various systems 404A-C, 406 and 410 may optionally limit the amount of data processed by each of such systems 404A-C, 406 and 410, such that information overflow may be prevented while also allowing results of behavioral analyses to be more efficiently presented (e.g. zero day detection, etc.).

Furthermore, the behavioral analysis rules generated by the systems may also be partitioned among such systems. For example, local behavioral analysis rules generated utilizing a local system 404A-C may be utilized only by such local system 404A-C. As another example, enterprise behavioral analysis rules generated utilizing the enterprise server 406 may only be transmitted to the local system 404A-C from which the analyzed data was received. Of course, however, the generated enterprise behavioral analysis rules may also be transmitted to all of the local systems 404A-C depending on how the overall system is configured.

In yet another example, global behavioral analysis rules generated utilizing the global system 410 may be transmitted from the global system 410 to the enterprise system 406. In addition, at least a portion of such global behavioral analysis rules may be transmitted from the enterprise system 406 to at least one of the local systems 404A-C (e.g. the local system 404A-C from which the data was identified, all of the local systems 404A-C, etc.). Of course, as another option, at least a portion of the global behavioral analysis rules may be transmitted (e.g. directly) from the global system 410 to at least one of the local systems 404A-C. Optionally, transmission of such global behavioral analysis rules may be under the control of the enterprise system 406, such that, for example, the enterprise system 406 must provide permission for such transmission.

It should be noted that while only a single enterprise system 406 and a single global system 410 are shown, multiple enterprise systems and/or multiple global systems may also be utilized. For example, the local systems 404A-C may each be in communication with the multiple enterprise systems, such that performing the behavioral analysis may further be partitioned among the multiple enterprise systems. Optionally, each of the multiple enterprise systems may be associated with a particular type of data, or a particular type of event (e.g. code injection, etc.) associated with the data. In this way, the enterprise system 406 may be selected for performing a behavioral analysis based on a type of the data.

In addition, the multiple enterprise systems may be in communication with one another, such that data received by one of the enterprise systems for behavioral analysis purposes may be communicated to another one of the enterprise systems for aggregation purposes. Thus, the aggregated data may be utilized by the other enterprise system during behavioral analysis. For at least similar purposes, the multiple global systems may also be in communication with the multiple enterprise systems and/or the local systems 404A-C.

Further, in one exemplary embodiment, the local systems 404A-C may each utilize different systems for behavioral analysis purposes based on an environment of the local systems 404A-C. For example, when the local system 404A-C is connected to the enterprise system 406 (e.g. connected to the enterprise network, etc.), the local system 404A-C may utilize the enterprise system 406 for performing behavioral analysis of enterprise level data. However, when the local system 404A-C is not connected to the enterprise system 406, the local system 404A-C may perform the behavioral analysis of enterprise level data. Optionally, environmental rules located on the local system 404A-C may delegate which system performs the behavioral analysis when the local system 404A-C is located in various types of environments.

As yet another option, the systems may be associated with a role based hierarchy. For example, the systems may be associated geographical based partitioning, such that designated systems each receive data from, and communicate rules and behavioral analysis results to, local systems 404A-C that are located in a particular geographical area (e.g. country, continent, etc.). As another example, the systems may be associated with business based partitioning, such that designated systems may each receive data from, and communicate rules and behavioral analysis results to, local systems 404A-C that are located in a particular enterprise network.

Figure 5A:
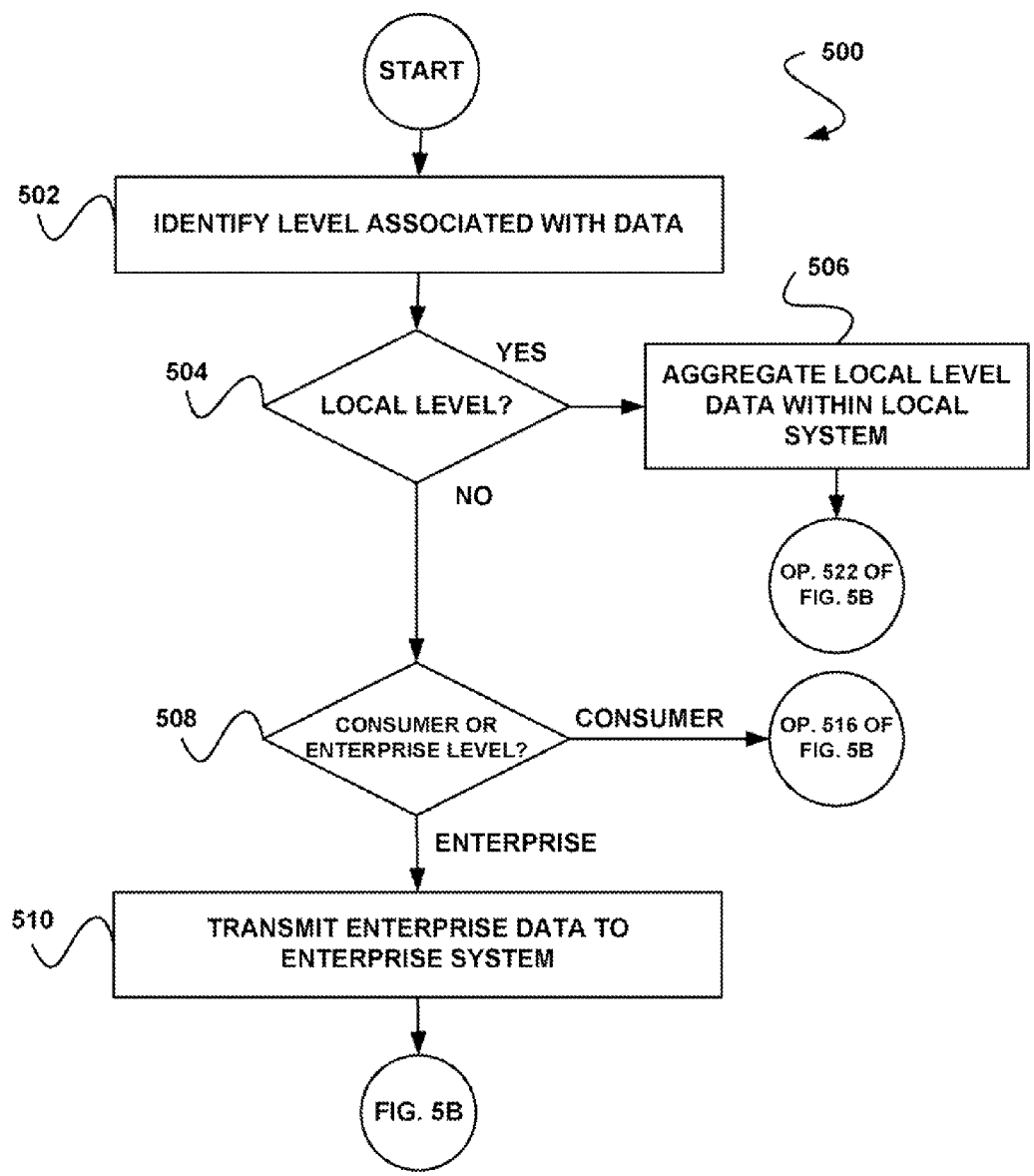
FIGS. 5A-B shows a method for generating a rule in response to a behavioral analysis of aggregated data, in accordance with yet another embodiment.
Figure 5B:
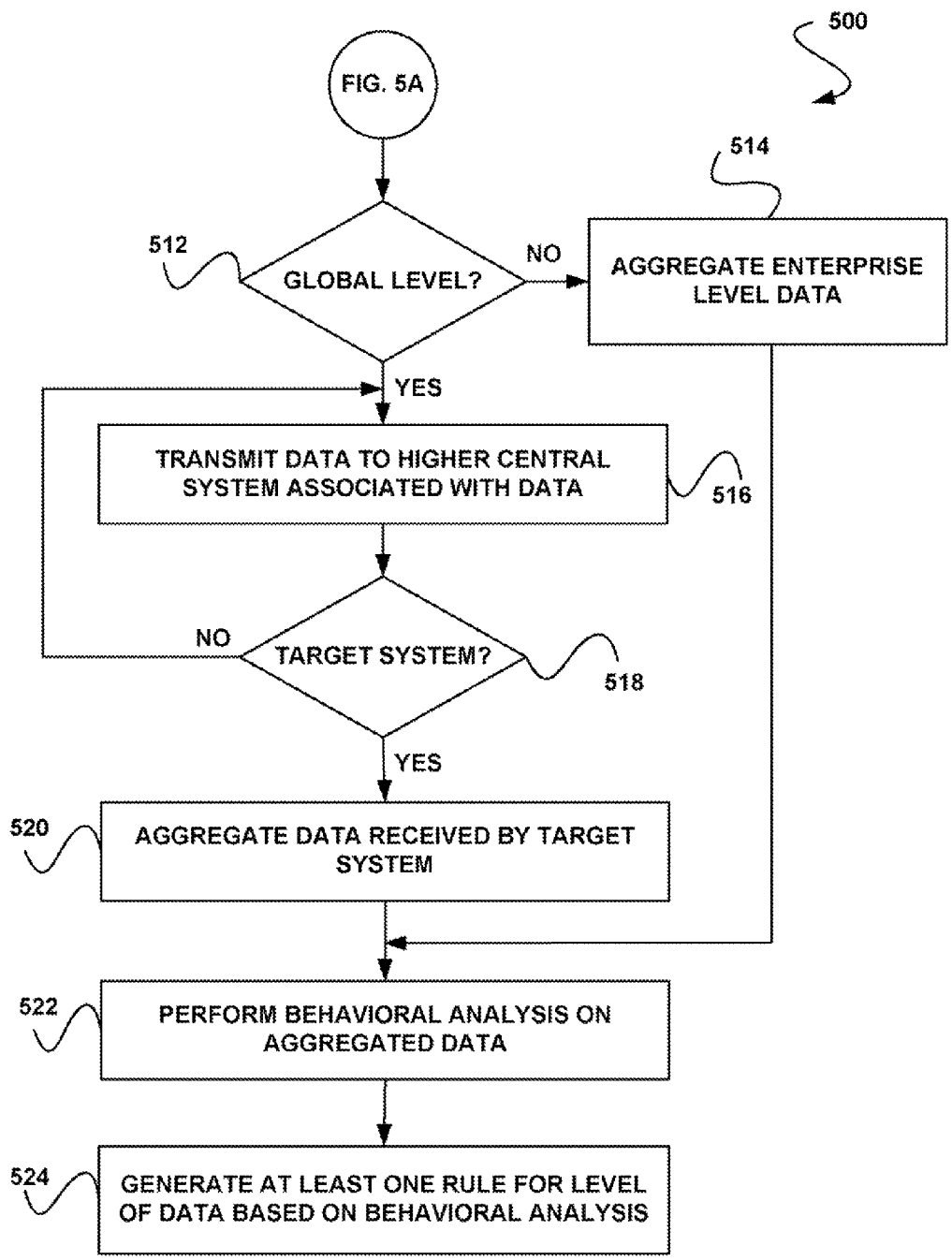

FIGS. 5A-B shows a method 500 for generating a rule in response to a behavioral analysis of aggregated data, in accordance with yet another embodiment. As an option, the present method 500 may be implemented in the context of the functionality and architecture of FIGS. 1-4. Of course, however, the method 500 may be carried out in any desired environment. Again, it should also be noted that the aforementioned definitions may apply during the present description.

As shown in operation 502, a level associated with data is identified. In one embodiment, the level associated with the data may be identified in response to an identification of the data. For example, an event may occur on a local system, and in response associated data (e.g. describing the event, etc.) may be identified. In turn, a level associated with such data may be identified.

In addition, it is determined whether the level is a local level, as shown in decision 504. As an option, the determination may be made by applying categorization rules to the data. For example, the categorization rules may identify levels associated with various types of data.

If it is determined that the level associated with the data is a local level, the local level data is aggregated within a local system. Note operation 506. In the context of the present description, such local system may include the local system on which the data was identified. Such aggregation may include associating the data with other data identified by the local system, in one embodiment. Just by way of example, the data may be combined with other data associated a same event.

Moreover, in response to the aggregation of the local level data at the local system, a behavioral analysis is performed on the aggregated data, as shown in operation 522. See FIG. 5B. In one embodiment, the behavioral analysis may be performed at the local system. To this end, local level data may be kept confidential.

Still yet, as shown in operation 524, at least one rule is generated for the local level data based on the behavioral analysis. For example, results of the behavioral analysis may be utilized for generating the rule. As an option, the local system may be utilized for manual generation or automatic generation of the rule.

Table 1 shows an exemplary behavioral analysis rule that may be generated for the data based on a behavioral analysis of the data. It should be noted that such behavioral analysis rule is set forth for illustrative purposes only, and thus should note be construed as limiting in any manner.

TABLE 1

```
//Event associated with data: CODE_INJECTION
//Source: actingProcess
//Targets: targetProcess, injectDLL
if (actingProcess.file.sig or inject.DLL.file.sig or targetProcess.sig in
white-list)
then
    allow the operation;
else
if (actingProcess.file.sig or injectDLL.file.sig or targetProcess.sig in
black-list)
```

TABLE 1-continued

```
then
    prevent the operation;
if (actingProcess.source is Internet)
then
    prevent the operation;
else
if (injectDLL.file.creator.source is Internet)
then
    prevent the operation;
else
    allow the operation
```

As shown in Table 1, if a signature of a file that stores a process initiating, an event is predetermined to be allowed (e.g. via predefined positive rules), the process may be allowed. If, however, the signature is predetermined to be disallowed (e.g. via predefined negative rules), the process may be prevented. In addition, if a source of the process is the Internet, the process may also be prevented.

However, if in decision 504 it is determined that the level of the data is not a local level, it is further determined whether the data is associated with a consumer level or an enterprise level. Note decision 508. If it is determined that the data is associated with a consumer level, the data is transmitted to a higher central system associated with the data, as shown in operation 516. In one embodiment, such higher central system may be associated with a level subsequently higher with respect to the local level.

In addition, it is determined whether data has been received by a target system, as shown in decision 518. In the context of the present embodiment, the target system may include a system capable of performing a behavioral analysis on the data that is associated with the level of the data. If it is determined that the data has not been received by the target system, the data is transmitted to another higher central system associated with the data (e.g. operation 516). Thus, the data may be transmitted from lower level systems to higher level systems, based on a hierarchy of such systems, until the data is received by the target system.

In response to a determination that the data has been received by the target system, the data is aggregated at the target system, as shown in operation 520. Thus, the data may be aggregated with other data located on the target system. Moreover, a behavioral analysis is performed on the aggregated data (see operation 522), and at least one rule is generated for the level of the data based on the behavioral analysis (see operation 524).

On the other hand, if in decision 508 it is determined that the data is associated with an enterprise level, the enterprise level data is transmitted to an enterprise system. Note operation 510. Further, it is determined whether the data is associated with a global level, as shown in operation 512. As an option, such determination may be made by the enterprise system. If it is determined that the data is not associated with the global level, the enterprise level data is aggregated, as shown in operation 514. For example, the enterprise level data may be aggregated at the enterprise system. Thus, the data may be aggregated with other data located at the enterprise system. As also shown, a behavioral analysis is performed on the aggregated data (see operation 522), and at least one rule is generated for the level of the data based on the behavioral analysis (see operation 524).

If it is determined that the data is associated with the global level (see decision 512), the data is transmitted to a higher central system associated with the data. Note operation 516.

Thus, as an option, the data may be associated with a plurality of levels (e.g. the enterprise level and the global level, etc.).

It is further determined whether data has been received by a target system, as shown in decision 518. If it is determined that the data has not been received by the target system, the data is transmitted to another higher central system associated with the data (e.g. operation 516). Again, the data may be transmitted from lower level systems to higher level systems, based on a hierarchy of such systems, until the data is received by the target system.

In response to a determination that the data has been received by the target system, the data is aggregated at the target system, as shown in operation 520. Thus, the data may be aggregated with other data located on the target system. Moreover, a behavioral analysis is performed on the aggregated data (see operation 522), and at least one rule is generated for the level of the data based on the behavioral analysis (see operation 524).

Figure 6:
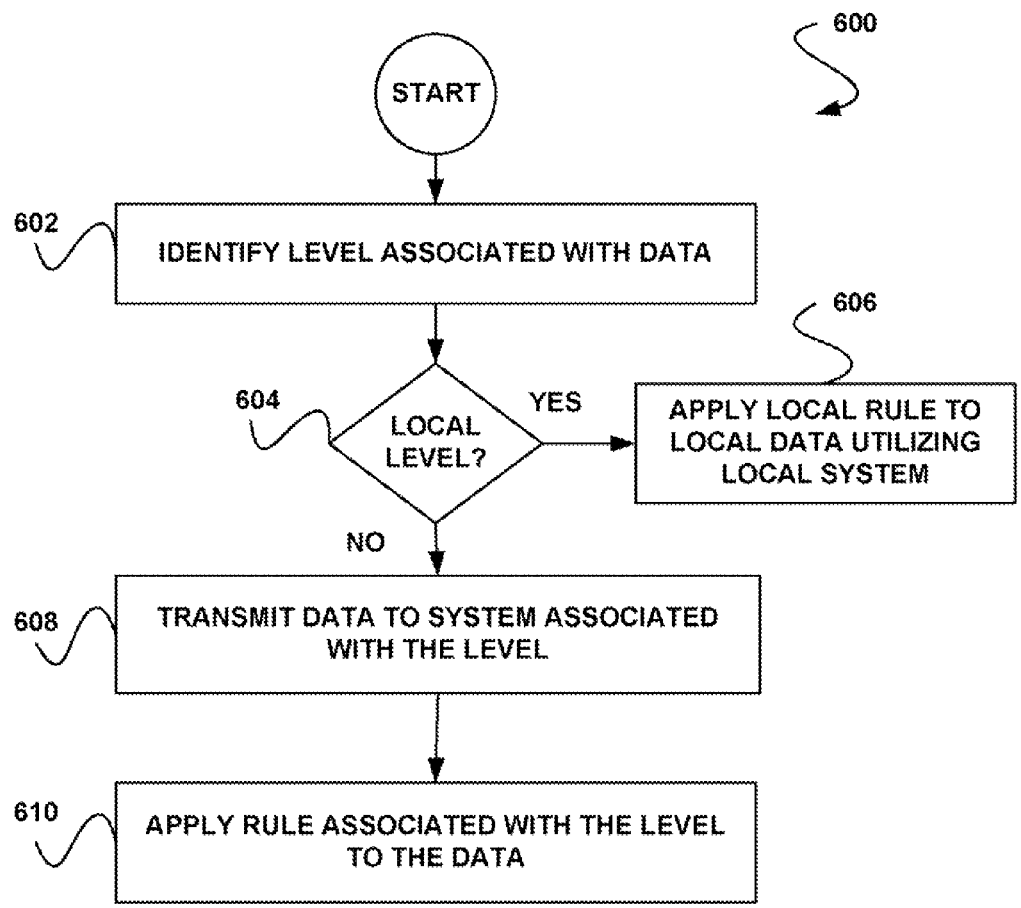
FIG. 6 shows a method for processing data utilizing a rule, in accordance with still yet another embodiment.

FIG. 6 shows a method 600 for processing data utilizing a rule, in accordance with still yet another embodiment. As an option, the present method 600 may be implemented in the context of the functionality and architecture of FIGS. 1-5. Of course, however, the method 600 may be carded out in any desired environment. Yet again, it should also be noted that the aforementioned definitions may apply during the present description.

As shown in operation 602, a level associated with data is identified. In one embodiment, the level associated with the data may be identified in response to an identification of the data. For example, an event may occur on a local system, and in response data associated therewith may be identified. In turn, a level associated with such data may be identified.

In addition, it is determined whether the level is a local level, as shown in decision 604. As an option, the determination may be made by applying categorization rules to the data. For example, the categorization rules may identify levels associated with various types of data.

If it is determined that the level associated with the data is a local level, a local behavioral analysis rule is applied to the data utilizing the local system, as shown in operation 606. For example, the local behavioral analysis rule may be stored on the local system. Optionally, a plurality of local behavioral analysis rules may also be applied to the data.

In one embodiment, the local rule may be selected from a plurality of local behavioral analysis rules based on its applicability to the data. For example, the local behavioral analysis rules may be applied to the data based on characteristics of the data. Furthermore, the local behavioral analysis rule may be utilized for allowing or preventing the event associated with the data, in one embodiment.

If, however, it is determined that the level associated with the data is not a local level, the data is transmitted to a system associated with the level of the data. Note operation 608. For example, if the level of the data is an enterprise level, the data may be transmitted from the local system to an enterprise system. As another example, if the level of the data is a global level, the data may be transmitted from the local system to a global system (e.g. via the enterprise system, etc.).

To this end, a behavioral analysis rule associated with the level of the data may be applied to the data, as shown in operation 610. For example, the system to which the data is transmitted may apply behavioral analysis rules stored thereon to the data. Accordingly, it may be determined whether the data, or event associated therewith, should be allowed or prevented, as an option.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
 identifying a level associated with data; and
 performing a behavioral analysis on the data utilizing one of a plurality of systems that is selected based on the identified level;
 wherein the level indicates a confidentiality of the data.

2. The method of claim 1, wherein the systems include a local system and a remote system.

3. The method of claim 1, wherein the systems include a local system, an enterprise system, and a global system.

4. The method of claim 1, wherein each of the systems includes a different set of behavioral analysis rules for performing the behavioral analysis.

5. The method of claim 1, wherein, if it is determined that a local system is selected, the behavioral analysis is performed utilizing the local system.

6. The method of claim 1, wherein, if it is determined that an enterprise system is selected, the data is transmitted from a local system to the enterprise system and the behavioral analysis is performed utilizing the enterprise system.

7. The method of claim 1, wherein, if it is determined that a global system is selected, at least a portion of the data is transmitted from an enterprise system to the global system and the behavioral analysis is performed utilizing the global system.

8. The method of claim 7, wherein the data is filtered before transmitting the portion of the data from the enterprise system to the global system.

9. The method of claim 1, wherein the data describes an event that occurred on a local system.

10. The method of claim 1, wherein behavioral analysis rules are generated utilizing a global system, based on the data collected from a plurality of other systems.

11. The method of claim 10, wherein the behavioral analysis rules are transmitted from the global system to another system.

12. The method of claim 11, wherein the behavioral analysis rules are transmitted from the global system to an enterprise system.

13. The method of claim 12, wherein at least a portion of the behavioral analysis rules are transmitted from the enterprise system to a local system.

14. The method of claim 10, wherein at least a portion of the behavioral analysis rules are transmitted from the global system to a local system.

15. The method of claim 14, wherein at least a portion of the behavioral analysis rules are transmitted from the global system to the local system, under the control of the enterprise system.

16. The method of claim 1, wherein the systems are hierarchical.

17. A computer program product embodied on a computer readable medium, comprising:
 computer code for identifying a level associated with data; and
 computer code for performing a behavioral analysis on the data utilizing one of a plurality of systems that is selected based on the identified level;
 wherein the level indicates a confidentiality of the data.

18. An apparatus, comprising:
a processor for identifying a level associated with data, and performing a behavioral analysis on the data utilizing one of a plurality of systems that is selected based on the level associated with the data;
wherein the level indicates a confidentiality of the data.

19. The apparatus of claim 18, wherein the processor remains in communication with memory and a display via a bus.

20. The method of claim 1, wherein the level associated with the data is identified based on predefined rules that indicate, for each level, characteristics associated with the data within the level.

21. The method of claim 1, wherein characteristics associated with the data are utilized for identifying the level associated with the data.

* * * * *